Patented June 26, 1923.

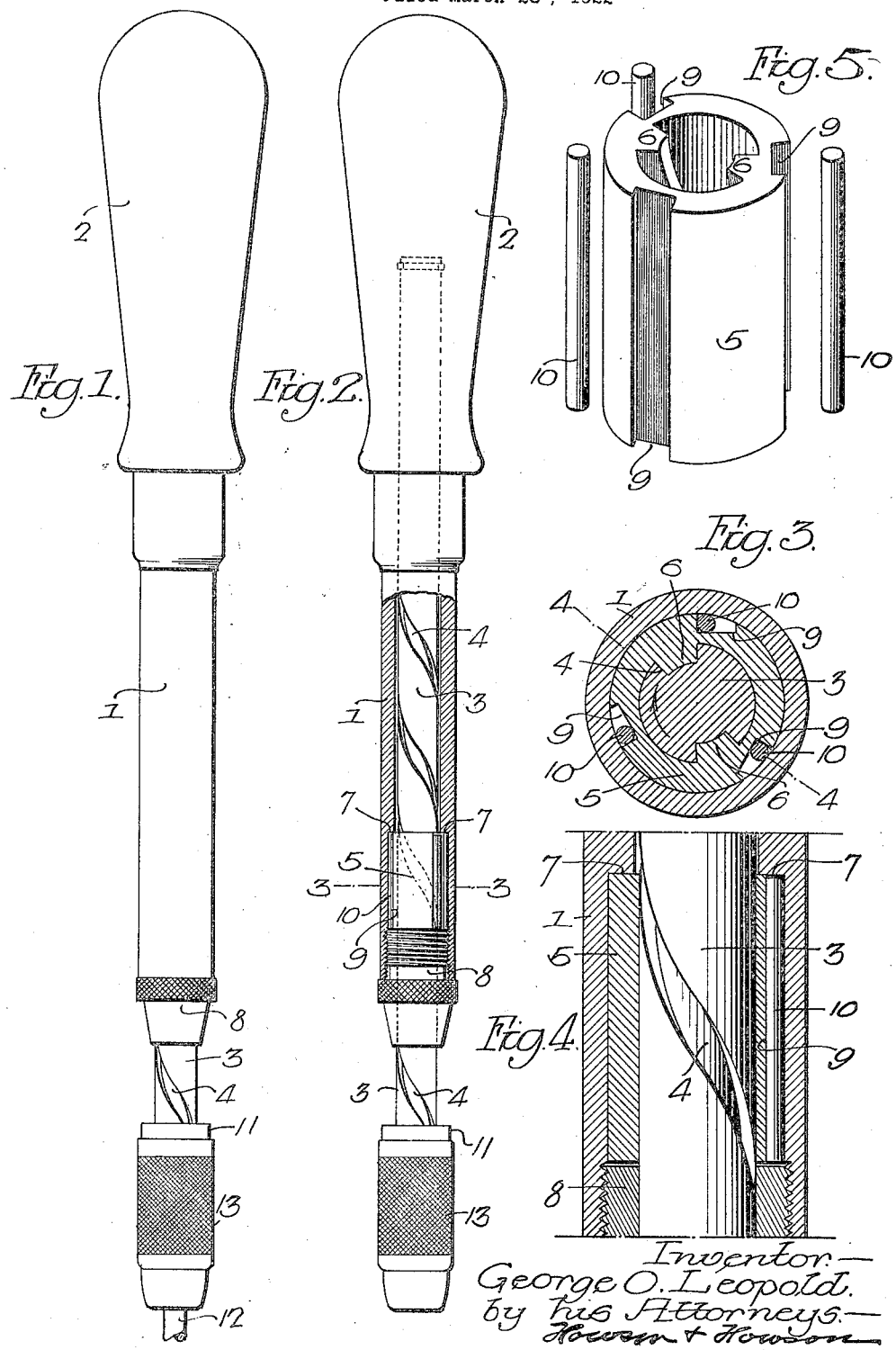

1,460,201

UNITED STATES PATENT OFFICE.

GEORGE O. LEOPOLD, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

SPIRAL TOOL.

Application filed March 28, 1922. Serial No. 547,442.

*To all whom it may concern:*

Be it known that I, GEORGE O. LEOPOLD, a citizen of the United States, residing in Philadelphia, Pennsylvania, have invented certain Improvements in Spiral Tools, of which the following is a specification.

The object of my invention is to design a spiral tool so that it will be substantial in construction and easily and cheaply manufactured, and in which rollers are used to clutch the nut to the barrel.

This object I attain in the following manner, reference being had to the accompanying drawings, in which:

Fig. 1 is a view, in elevation, illustrating my improved spiral tool;

Fig. 2 is a view, similar to Fig. 1, partly in section;

Fig. 3 is a sectional view on the line 3—3, Fig. 2;

Fig. 4 is a sectional view on the line 4—4, Fig. 3; and

Fig. 5 is a detached perspective view of the nut and rollers.

Referring to the drawings, 1 is the barrel of the spiral tool. 2 is the handle, which is firmly secured to the barrel in any suitable manner. 3 is a spindle extending through the barrel and into the handle and having spiral grooves 4 cut therein. 5 is a nut shown clearly in Fig. 5, having two spiral ribs 6, which extend into the grooves 4. The nut 5 is located within the barrel 1 and rests against the shoulder 7 of the barrel. The nut is held in this position by a threaded sleeve 8 through which the spindle extends. The sleeve has an external thread, which is adapted to an internal thread at the end of the barrel so that, while the nut is free to turn in the barrel, it is held from longitudinal movement. The nut has three longitudinal grooves in its periphery. The rear wall of each groove is in a plane radial to the center of the nut and the base of each groove is in a plane at right angles to said radial plane forming, with the curved wall of the barrel, a tapered recess.

10 designate rollers adapted to the grooves 9. These rollers are proportioned to fit the wide ends of the tapered grooves so that they will turn freely therein when the nut is turned in one direction, but will bind immediately when the nut is turned in the opposite direction, the rollers holding the nut to the handle. At the outer end of the spindle 3 is a chuck 11 of any suitable type by which the tool 12, Fig. 1, can be secured to the spindle. The tool may be a screw driver bit or a drill bit.

13 is a loose sleeve on the chuck, which can be grasped by one hand of the operator when pushing on the handle.

The operation is as follows: The handle of the tool is grasped in one hand and the sleeve 13 is held by the other hand and the spindle is drawn out. On pressing the handle, the spindle is turned in the direction of the arrow, Figs. 2 and 3, the nut 4 being turned in the opposite direction until the rollers 10 are jammed in the tapered recess between the bottom of the grooves and the interior wall of the barrel. This forms a clutch, which holds the nut against further rotation, and, consequently, the spindle is turned in the nut, positively turning the tool in one direction. When the barrel and the handle are retracted, the nut is released from the barrel and is free to turn on the spindle, while the spindle remains stationary. This construction is simple and the nut can be of any length desired. The rollers 10 can also be of any length, making a substantial clutch member. By removing the sleeve 8, the nut can be withdrawn.

When it is necessary to equip the tool with new rollers, this can be quickly accomplished.

I claim:

The combination in a spiral tool, of a barrel having an internal shoulder and threaded at one end; a cylindrical nut located in the barrel, one end of said nut resting against the shoulder; a screw-threaded sleeve secured to the threaded end of the barrel and holding the nut in position; a handle secured to the barrel; a spindle having a spiral groove and extending through the sleeve and nut and into the barrel, the nut having a series of longitudinal grooves in its periphery, the rear wall of each groove being in a radial plane of the nut, the base of each groove being in a plane at right angles to the rear wall of the groove; and a roller located in each groove and arranged to lock the nut to the barrel when the nut is turned in one direction.

GEORGE O. LEOPOLD.